March 8, 1938.  L. ECKLER  2,110,292
MEANS FOR SUPPORTING CAMERAS ON VEHICLES
Filed April 4, 1935
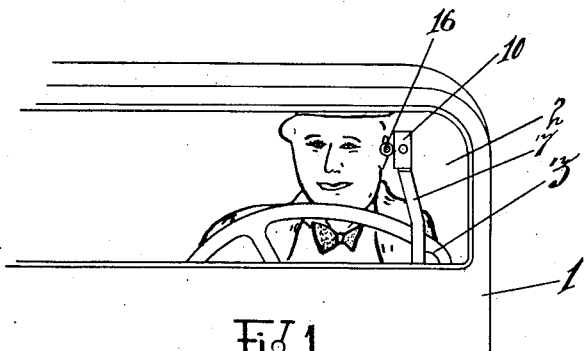
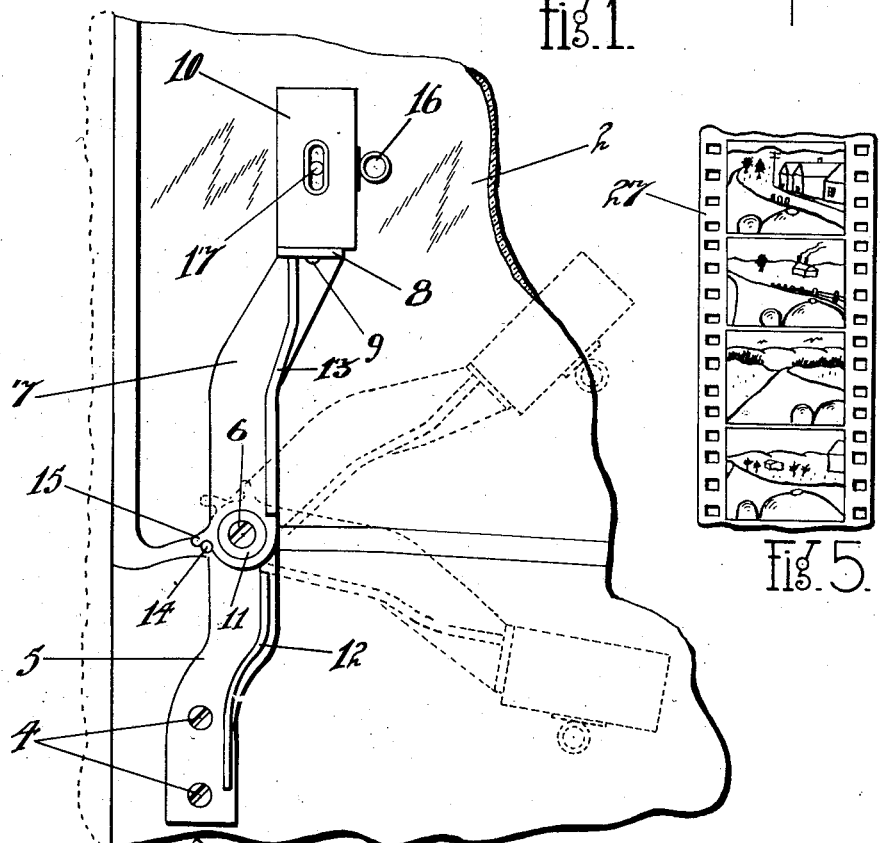
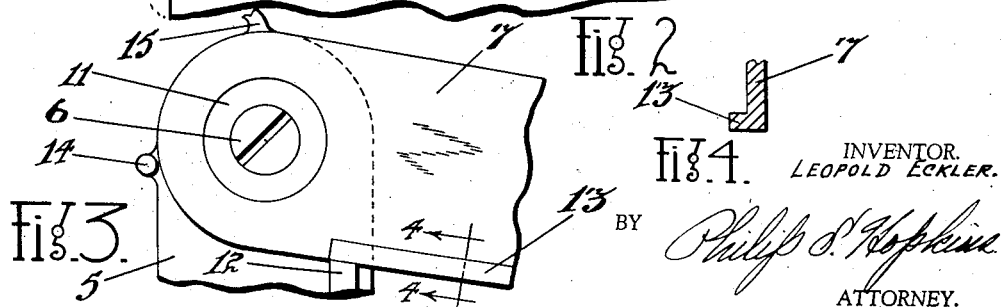
INVENTOR.
LEOPOLD ECKLER.
BY
Philip S. Hopkins
ATTORNEY.

Patented Mar. 8, 1938

2,110,292

UNITED STATES PATENT OFFICE 2,110,292

MEANS FOR SUPPORTING CAMERAS ON VEHICLES

Leopold Eckler, Binghamton, N. Y., assignor to Agfa Ansco Corporation, Binghamton, N. Y., a corporation of New York Application April 4, 1935, Serial No. 14,662

4 Claims. (Cl. 95—86)

My invention relates to a vehicle camera and has for its primary object the provision of the combination of a vehicle and a camera mounted therein in such manner as to make easily possible the dependable taking of pictures while traveling in the vehicle with a minimum amount of effort.

It very often occurs that while driving along the road or street in an automobile a particularly pleasing or interesting view or scene appears ahead of the car of which the occupant of the car would like to have a photograph either for the inherent attractiveness or beauty of the scene or because of some particularly interesting feature of it.

Often too, in driving along in a car one will come upon the scene of an accident or some other unusual occurrence which has photographic value and interest.

In most cases the time limit or inclination does not permit of stopping the car and getting out and making the desired photographic record of the view or scene.

By my invention I have provided a means whereby the occupant of the car, whether the driver or a passenger in the front seat can readily and easily make a photographic record of the scenes ahead while the car continues along its journey, and with but very little effort.

This invention provides a particularly effective means of photographically recording a pleasure trip by auto through scenic or historic sections without taking the usual time and going to the ordinary effort and trouble incident to the use of a camera in the ordinary way.

Other objects and advantages will be apparent as the description proceeds, reference now being had to the figures of the accompanying drawing forming a part of this application, and wherein like reference numerals indicate like parts.

In the drawing:

Figure 1 is a partial front view of an automobile illustrating the use of my invention.

Figure 2 is a detail view illustrating the camera mounting within the vehicle.

Figure 3 is a detail view illustrating the camera support in one position.

Figure 4 is a detail cross sectional view taken on the line 4—4 of Figure 3.

Figure 5 is a detail view showing the type of photographic record obtained by the use of my invention.

The reference character 1 illustrates generally the front of an automobile provided with the ordinary transparent windshield 2 providing a means of visibility for the occupants of the car. The steering wheel is indicated in its normal position at 3.

At a suitable point on the interior of the car and preferably secured as at 4 to a portion of the rigid frame work is a fixed bracket 5, to the upper end of which is pivoted as at 6 a supporting bracket 7 provided on its upper end with a flat surface 8 upon which is suitably secured as by means of a screw 9 a photographic camera 10. The supporting bracket 7 is so located as to support the camera directly to the rear of the transparent windshield 2 whereby the exposures are made through such windshield.

At the point 6 where the adjustable supporting bracket 7 is pivoted to the fixed bracket 5, there is provided a spring washer 11 normally held under tension by the pivot screw 6 which serves to frictionally maintain the supporting bracket 7 and camera 10 in its adjusted position.

It will be noted that the fixed bracket 5 is provided with a laterally extending rib 12 terminating adjacent the upper end thereof. The adjustable supporting bracket 7 is likewise provided with a flange or laterally extending rib 13 terminating adjacent its lower end. The relation of these ribs 12 and 13 is such that when the supporting bracket 7 is pivoted downwardly to the lower dotted line position shown in Figure 2, the rib 13 engages against the upper end of the rib 12, the latter providing a fixed stop limiting the downward movement of the bracket 7 and camera 10. This is the normal position of the supporting bracket and camera when the same is not in use. In this position, as will be clear from Figure 2, the camera and supporting bracket are located down below the windshield and entirely out of the way. When it is desired to use the camera, however, the supporting bracket 7 and camera are pivoted upwardly to the position shown in full lines in Figure 2. The upper end of the supporting bracket 5 is provided with a rigid lug 14 and the pivoted bracket 7 is provided adjacent its lower end with a finger 15. The relation of the lug 14 and finger 15 is such that the latter engages against the lug and limits the further movement of the bracket 7 and camera to a position in which the camera is in upright vertical alignment and in erect position for taking pictures.

Mounted upon one side of the camera 10 there is provided a view finder 16, which when the supporting bracket 7 and camera are moved to the upper or picture taking position behind the windshield, is disposed in substantial alignment with the normal line of vision of the occupant of the car. In the form shown in Figures 1 to 4 the camera is mounted on the driver's side of the vehicle although it will be clearly understood that it may be mounted on the opposite side in position for use by a front seat passenger, or, there may be one mounted on each side of the car, or one mounted centrally for movement to either side.

The device is so disposed within the vehicle that in the operating position the camera is not directly in front of the occupant but slightly to one side of the line of vision whereby it does not interfere with the occupant's vision through the windshield and yet is substantially in such line whereby it requires but a very slight shifting of the occupant's head to sight through the view finder for the purpose of making an exposure.

While any desired type of photographic camera may be provided on the bracket 7, such as an ordinary box camera, folding camera, or movie camera, the preferred type is that form of camera which uses a strip of film upon which may be made a series of exposures and which is provided with a very simple means for moving the film either before or after each exposure to bring a fresh section into exposed position. In the form shown the film moving device is indicated at 17 and comprises a slide member which may be quickly and readily moved downwardly by the operator at each exposure.

By placing the view finder on the side of the camera nearest the occupant of the car, the view or scene to be photographed can be more readily lined up. The operation of the camera for making the exposure is, of course, conventional and merely requires the snapping of a suitable shutter or exposure device on the camera, the actuating device preferably serving also to shift the film.

After the desired exposures have been made, the operator merely moves the supporting bracket 7 downwardly which disposes the camera and bracket out of the way and entirely out of the line of vision of the occupant.

In Figure 5 I have illustrated a small section of film 27 such as is exposed in the use of my invention and upon which is illustrated the type of scenes photographed.

While I have shown the invention as applied to a vehicle provided with a transparent windshield through which the exposures are made, it will be apparent that it is equally adaptable to a vehicle entirely open in front.

Of course, changes may be made in details of construction and arrangement of parts without departing from the spirit and scope of my invention. I do not limit myself, therefore, to the exact form herein shown and described other than by the appended claims.

I claim:

1. A camera supporting means for automobiles comprising a movable arm having camera attaching means on one end thereof, a fixed stop for said arm for limiting the movement thereof in one direction to a position to dispose the camera end of the arm in substantial alignment with the normal forward vision line of the driver of the automobile, and said arm being movable away from said stop to dispose the camera end entirely out of said vision line.

2. A camera supporting means for automobiles comprising a movable arm having camera attaching means on one end thereof, a fixed stop for said arm for limiting the movement thereof in one direction to a position to dispose the camera end of the arm in substantial alignment with the normal forward vision line of the driver of the automobile, said arm being movable away from said stop to dispose said arm and the camera end thereof entirely out of said vision line, and friction means for holding said arm in either adjusted position.

3. A camera supporting means for automobiles comprising a pivoted arm having camera attaching means on one end thereof, a stop finger on said arm adjacent the pivot thereof, a fixed stop with which said finger engages in one position of said arm in which the camera end thereof is in substantial alignment with the normal forward vision line of the driver of the automobile, and a second fixed stop engageable by said arm in another position in which the arm and camera end thereof are entirely out of such vision line.

4. A camera supporting means for automobiles comprising a pivoted arm having camera attaching means on one end thereof, a stop finger on said arm adjacent the pivot thereof, a fixed stop with which said finger engages in one position of said arm in which the camera end thereof is in substantial alignment with the normal forward vision line of the driver of the automobile, and a second fixed stop engageable by said arm in another position in which the arm and camera end thereof are entirely out of such vision line, and friction means associated with the pivot of said arm for holding said arm in either position.

LEOPOLD ECKLER.